United States Patent
Rampold et al.

(10) Patent No.: US 6,839,254 B2
(45) Date of Patent: Jan. 4, 2005

(54) POWER SUPPLY WITH LOW LOSS MAKING CURRENT LIMITATION

(75) Inventors: Andreas Rampold, Mittweida (DE); Jörg Weiss, Chemnitz (DE)

(73) Assignee: Siemens Aktiengesellschaft, Munich (DE)

( * ) Notice: Subject to any disclaimer, the term of this patent is extended or adjusted under 35 U.S.C. 154(b) by 52 days.

(21) Appl. No.: 10/297,404

(22) PCT Filed: Jun. 8, 2001

(86) PCT No.: PCT/DE01/02152

§ 371 (c)(1),
(2), (4) Date: Dec. 6, 2002

(87) PCT Pub. No.: WO01/95049

PCT Pub. Date: Dec. 13, 2001

(65) Prior Publication Data

US 2003/0161082 A1 Aug. 28, 2003

(30) Foreign Application Priority Data

Jun. 8, 2000  (DE) .................................... 200 10 283 U

(51) Int. Cl.⁷ ............................................... H02M 7/04
(52) U.S. Cl. ......................... 363/89; 323/277; 323/908
(58) Field of Search ................................ 323/273–276, 323/278, 277, 908; 363/84, 125, 126, 89

(56) References Cited

U.S. PATENT DOCUMENTS

| | | | | |
|---|---|---|---|---|
| 3,796,943 A | | 3/1974 | Nelson | |
| 4,180,768 A | * | 12/1979 | Ferraro | 323/278 |
| 4,346,342 A | * | 8/1982 | Carollo | 323/276 |
| 4,814,687 A | * | 3/1989 | Walker | 323/275 |
| 4,837,653 A | | 6/1989 | Yip | |
| 5,041,777 A | * | 8/1991 | Riedger | 323/277 |
| 5,642,034 A | * | 6/1997 | Amano | 323/277 |
| 6,281,669 B1 | * | 8/2001 | Brakus | 323/324 |

FOREIGN PATENT DOCUMENTS

| | | |
|---|---|---|
| DE | 2 044 782 | 3/1972 |
| DE | 25 26 478 | 12/1976 |
| DE | 35 02 195 A1 | 7/1986 |
| DE | 39 32 399 C1 | 11/1990 |
| WO | 99/12240 | 3/1999 |

\* cited by examiner

Primary Examiner—Gary L. Laxton
(74) Attorney, Agent, or Firm—Harness, Dickey & Pierce P.L.C.

(57) ABSTRACT

A power supply includes a storage capacitor which can be charged with a rectified input current by means of a current-limiting element which is controlled by a drive circuit. The direct-axis component of current and the direct-axis component of voltage on the current limiting element are supplied to the control circuit as input values and the current limiting element is controlled in such a way that it is not subjected to more than a predetermined maximum power loss.

20 Claims, 2 Drawing Sheets

POWER SUPPLY WITH LOW LOSS MAKING CURRENT LIMITATION

This application is the national phase under 35 U.S.C. § 371 of PCT International Application No. PCT/DE01/02152 which has an International filing date of Jun. 8, 2001, which designated the United States of America and which claims priority on German Patent Application number DE 200 10 283.4 filed Jun. 8, 2000, the entire contents of which are hereby incorporated herein by reference.

FIELD OF THE INVENTION

The invention generally relates to a power supply having a rectifier for rectifying an input AC voltage and having an energy-storage capacitor which can be charged from the rectified input voltage via a current limiting element which is controlled by a drive circuit.

BACKGROUND OF THE INVENTION

In appliances such as these, special precautions have to be taken in order to minimize the loads on the mains power supply system caused when these appliances are switched on. For this purpose, a known power supply having inrush current limiting SBG and having a voltage regulator SRE is illustrated in FIG. 1. An input AC voltage $U_w$ is in this case supplied, after rectification in a rectifier GLB, as a pulsed DC voltage $U_g$ via a current limiting circuit SBG to an energy-storage capacitor C, the voltage across which is $U_c$, and which is connected in parallel with the input of a voltage regulator SRE or some other load. $U_a$ denotes the output voltage of the regulator SRE.

The energy-storage capacitor C is used for bridging short-term failures of the input voltage $U_g$, which is in the form of a DC voltage or, in particular, an unsmoothed voltage which is produced at the output of a rectifier GLB. The energy-storage capacitor C generally has a high capacitance and, when the power supply is switched on, it must first of all be charged up, with the current limiting circuit SBG preventing excessively high inrush current surge values during this charging process.

FIG. 2 shows a further known power supply with inrush current limiting, in which the load current drawn from the regulator SRE in this case does not flow via the current limiter SBG, in order to reduce the power loss. For the purposes of this application, the differences between FIG. 1 and FIG. 2 are, however, irrelevant.

As soon as the capacitor C has been charged up, the current limiting must assume a low resistance in order that the currents flowing do not cause any further losses and, if necessary, the capacitor C can emit its energy with a low internal impedance to the load. Such active current limiting is designed in a characteristic manner, for example with current sources.

When a capacitor is charged up via such current limiting, virtually the same amount of energy which is absorbed by the capacitor is converted into heat in the transistor which is used for current limiting. The power loss in the current limiting element is directly proportional to the voltage difference between the input voltage and the capacitor voltage, assuming that the limiting current is set such that it is constant. The power loss in the limiting element thus fluctuates between zero and a maximum value within one half-cycle of the input voltage $U_g$. The power loss which occurs is particularly critical in power supplies which have to emit a relatively high current during normal operation since, as is self-evident, the limiting current must be higher than the maximum operating current. Owing to the short-term load on the limiting transistor which is normally used, this has had to be greatly derated, since it is necessary to design it for the pulse power loss at the voltage maximum in conjunction with the transient thermal impedance.

SUMMARY OF THE INVENTION

One object of an embodiment of the invention is thus to specify a power supply with a current limiting circuit, which allows the use of low-cost limiting elements with a low permissible power loss.

This object may be achieved by a power supply in which, according to an embodiment of the invention, the drive circuit is supplied as input variables with the series current and with the series voltage across the current limiting element, and the drive circuit is set up to drive the current limiting element such that it is loaded with no more than a maximum power loss which can be predetermined.

Thanks to an embodiment of the invention, which takes account not only of the current but also of the power, low-cost limiting elements can be used with the main power supply system being effectively protected and, if necessary, the load as well.

In this case, it is possible in particular to provide that the drive circuit is set up to switch off the current via the current limiting element on reaching a limit voltage which corresponds to the maximum power loss.

Approximate consideration of the maximum power loss, which is nevertheless sufficient in most cases, can be achieved if the drive circuit is set up to regulate the current via the limiting element along a straight line which runs essentially below the hyperbola of the maximum power loss in the I/U family of characteristics.

On the other hand, with somewhat greater circuit complexity than the best possible solution, it is also possible to provide for the drive circuit to be set up via the limiting element to regulate the current essentially along a hyperbola which corresponds to the maximum power loss.

One practical implementation is distinguished in that the current limiting element is a series transistor connected in series with a measurement resistor, the control electrode of which series transistor is driven firstly via a further transistor in order to provide a current source and secondly via a comparator signal which is obtained by comparison of the voltage across the series transistor with the limit voltage.

In another practical implementation, an embodiment of the invention provides that the current limiting element is a series transistor connected in series with a measurement resistor. Further, it is driven by a transistor whose input circuit is supplied firstly with a signal which is proportional to the voltage drop across the measurement resistor and secondly with a signal which is proportional to the voltage across the series transistor.

In one optimum implementation, an embodiment of the invention provides that the current limiting element is a series transistor connected in series with a measurement resistor. Further, it is driven by two control amplifiers, with one control amplifier being supplied firstly with a reference value which corresponds to the maximum power loss and secondly with the output of a multiplier, which multiplies the measured series current by the voltage across the series transistor, and with the other control amplifier being supplied with the measured series current and with a reference value which corresponds to the maximum current.

BRIEF DESCRIPTION OF THE DRAWINGS

The invention together with further advantages will be explained in more detail in the following text with reference to the attached drawings, in which.

DETAILED DESCRIPTION OF THE PREFERRED EMBODIMENTS

Figure 1:
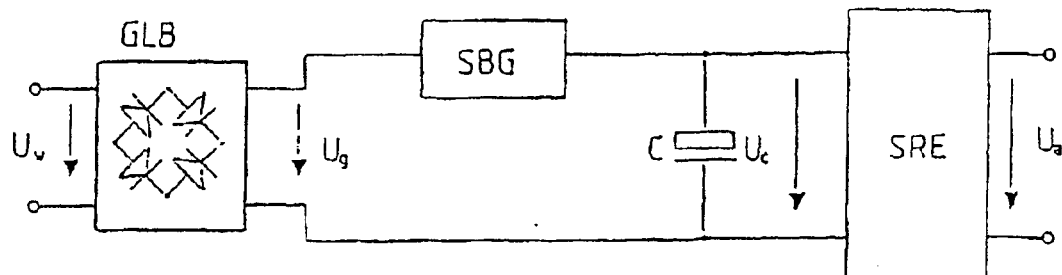
FIG. 1 and FIG. 2 show two embodiments of known power supplies, corresponding to the prior art.
Figure 2:
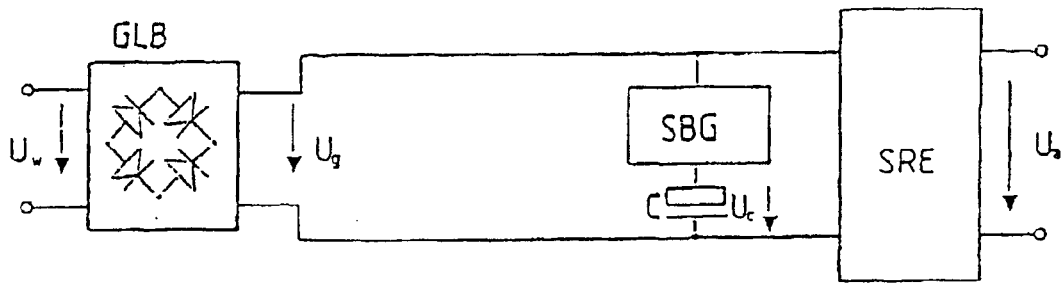
Figure 3:
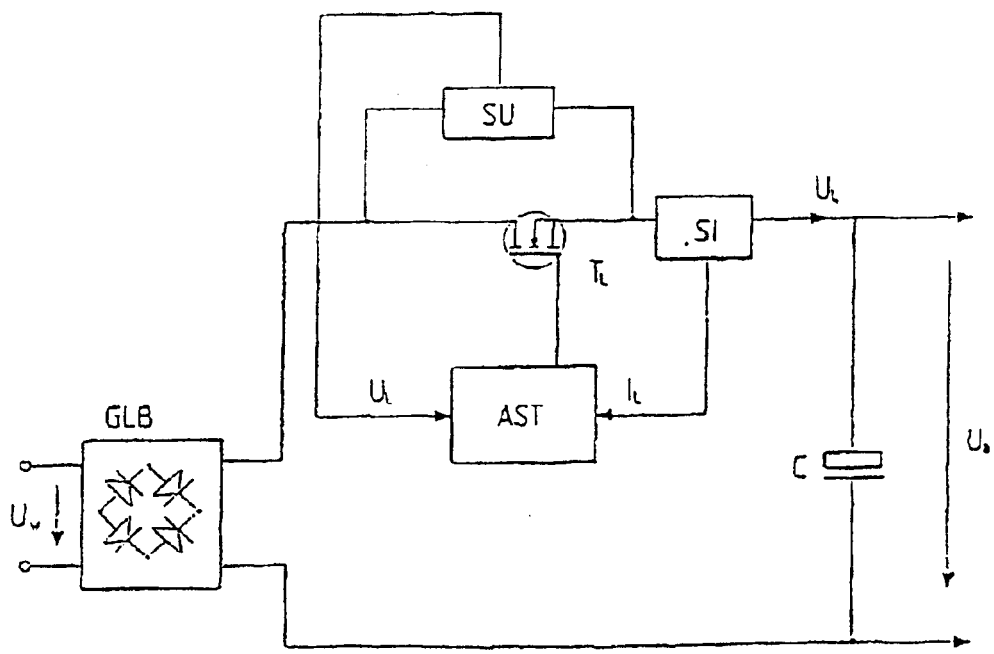
FIG. 3 shows a general embodiment of a power supply according to the invention, in the form of a block diagram.

In the circuit according to an embodiment of the invention as shown in FIG. 3, a DC voltage $U_g$ is likewise produced from an AC voltage $U_w$ via a rectifier GLB. This voltage $U_g$ is supplied via a current limiting element, such as a field-effect transistor $T_L$ in this case, to the energy-storage capacitor C.

Figure 7:
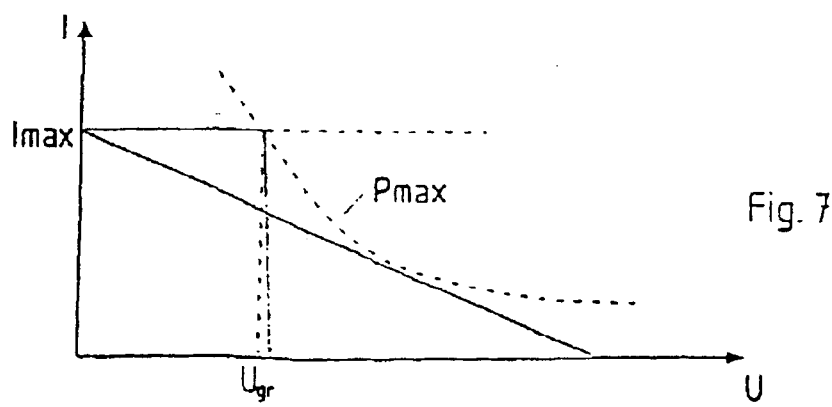

The series current $i_L$ is measured by a current sensor SI, and a voltage sensor SU is used for measuring the voltage $U_L$ across the transistor $T_L$. The signals from the current and voltage sensors are linked to one another and are converted to a drive signal for the transistor $T_L$ such that one of the U-I characteristics illustrated in FIG. 7 is produced across the transistor $T_L$.

Figure 4:
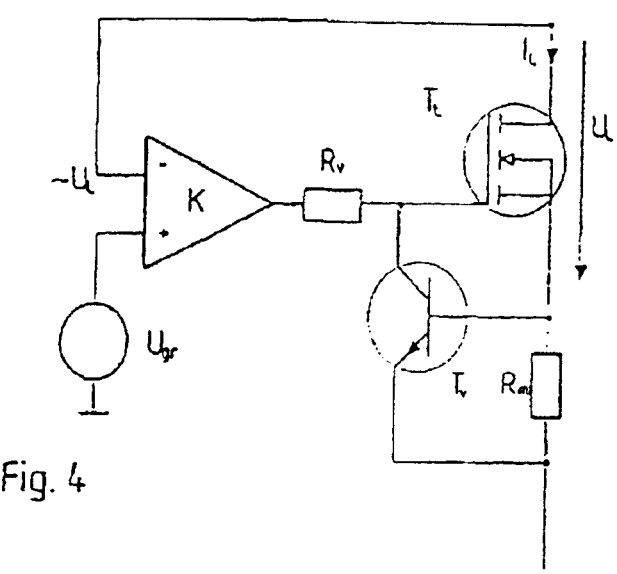
FIG. 4 shows a circuit detail of a first embodiment of the invention.

FIG. 4 shows a variant in which a field-effect transistor $T_L$ is likewise used as the current limiting element. A very low-resistance measurement resistor Rm which is connected in series with the transistor $T_L$ is used as the current sensor, with the voltage which is dropped across this measurement resistor Rm and is proportional to the series current $i_L$ controlling a transistor $T_v$ via its base-emitter junction. The collector circuit of this transistor $T_v$ in turn drives the field-effect transistor $T_L$.

On the other hand, the control electrode of the field-effect transistor $T_L$ also receives via a resistor $R_v$—a switching-off signal from the output of a comparator K, one of whose inputs is supplied with the series voltage $U_L$ across the transistor $T_L$ and whose other input is supplied with a limit voltage $U_{gr}$ as a reference voltage. In this context, reference should also be made to FIG. 7, which clearly shows that, on switching on in the circuit as shown in FIG. 4, current limiting first of all takes place along a horizontal straight line where $I=I_{max}$ and, on reaching the limit voltage $U_{gr}$ where $I_{max} \cdot U_{gr} = P_{max}$, switching-off takes place de facto along a steeply falling straight line.

Figure 5:
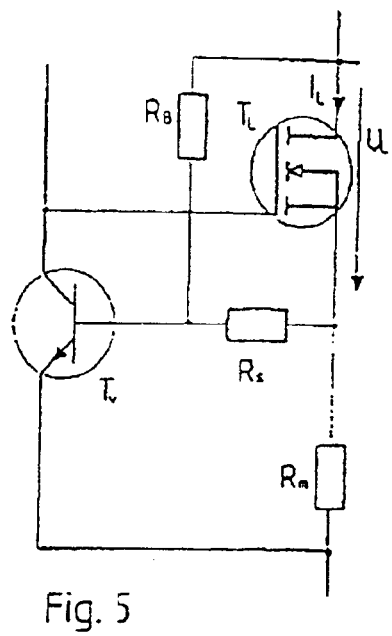
FIG. 5 shows a circuit detail of a second embodiment of the invention.

In the embodiment of the invention shown in FIG. 5, in which the same reference symbols are used where they correspond to those in FIG. 4, the series voltage $U_L$ is applied in the form of a corresponding current via a resistor $R_B$ to the base of the drive transistor $T_v$, with yet another resistor $R_S$ being connected between the base of $T_v$ and the junction point between the transistor $T_L$ and the measurement resistor $R_m$. In this variant, the current $i_L$ is limited along a straight line (see FIG. 7) which is located underneath the hyperbola of the maximum power $P_{max}$, or touches this hyperbola at one point.

Figure 6:
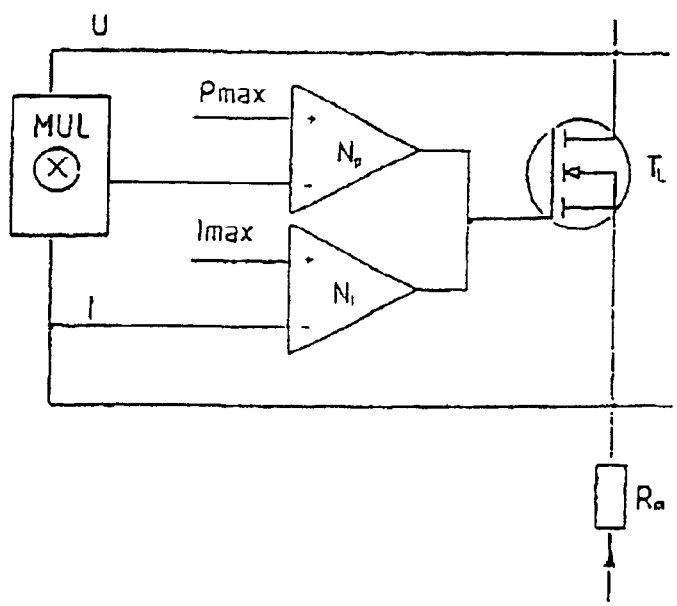
FIG. 6 shows a circuit detail of a third embodiment of the invention, and FIG. 7 uses a U/I diagram to show possible control and switching-off characteristics of current limiting circuits according to the invention.

While the embodiments based on FIG. 4 and FIG. 5 make use of the maximum power at only one point in each case, FIG. 6 shows a virtually ideal solution, which always operates with the maximum power below the predetermined maximum current. As in the first two embodiments, the current is measured using a measurement resistor $R_m$ and is in this case limited to the value $I_{max}$ by an operational amplifier $N_1$. A multiplier MUL uses the current and the voltage across the transistor $T_L$ to determine the instantaneous power loss, while a further operational amplifier $N_P$ provides regulation at the predetermined reference value $P_{max}$. The two operational amplifiers are connected to one another such that, for example via open collector outputs, the respectively lower output voltage is applied to the control electrode of the transistor $T_L$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A power supply, comprising:
a rectifier for rectifying an input AC voltage; and
an energy-storage capacitor, adapted to be charged from the rectified input voltage via a current limiting element controlled by a drive circuit, wherein the drive circuit is supplied, as input variables, with series current and with series voltage across the current limiting element, and wherein the drive circuit is set up to drive the current limiting element such that it is loaded with no more than a maximum predeterminable power loss.

2. The power supply as claimed in claim 1, wherein the drive circuit is set up to switch off the current via the current limiting element upon reaching a limit voltage corresponding to the maximum power loss.

3. The power supply as claimed in claim 1, wherein the drive circuit is set up to regulate the current via the limiting element along a straight line, running essentially below a hyperbola of the maximum power loss in an I/U family of characteristics.

4. The power supply as claimed in claim 1, wherein the drive circuit is set up via the limiting element to regulate the current essentially along a hyperbola corresponding to the maximum power loss.

5. The power supply as claimed in claim 2, wherein the current limiting element is a series transistor connected in series with a measurement resistor, the control electrode of the series transistor being driven firstly via a further transistor and secondly via a comparator signal, obtained by comparison of the voltage across the series transistor with a limit voltage.

6. The power supply as claimed in claim 4, wherein the current limiting element is a series transistor connected in series with a measurement resistor and driven by a transistor whose input circuit is supplied firstly with a signal proportional to the voltage drop across the measurement resistor and secondly with a signal proportional to the voltage across the series transistor.

7. The power supply as claimed in claim 4, wherein the current limiting element is a series transistor connected in series with a measurement resistor and driven by two control amplifiers, with one control amplifier being supplied firstly with a reference value corresponding to the maximum power loss and secondly with the output of a multiplier, adapted to multiply the measured series current by the voltage across the series transistor, and with the other control amplifier being supplied with the measured series current and with a reference value corresponding to the maximum current.

8. A power supply, comprising:
rectification means for rectifying an input AC voltage; and energy-storage means for charging from the rectified input voltage via a current limiting element controlled by a drive means, wherein the drive means is supplied, as input variables, with series current and with series voltage across the current limiting element, and wherein the drive means is for driving the current limiting element such that it is loaded with no more than a maximum predeterminable power loss.

9. The power supply as claimed in claim 8, wherein the drive means is set up to switch off the current via the current limiting element upon reaching a limit voltage corresponding to the maximum power loss.

10. The power supply as claimed in claim 8, wherein the drive means is set up to regulate the current via the limiting element along a straight line, running essentially below a hyperbola of the maximum power loss in an I/U family of characteristics.

11. The power supply as claimed in claim 8, wherein the drive means is set up via the limiting element to regulate the current essentially along a hyperbola corresponding to the maximum power loss.

12. The power supply as claimed in claim 9, wherein the current limiting element is a series transistor connected in series with a measurement resistor, the control electrode of the series transistor being driven firstly via a further transistor and secondly via a comparator signal, obtained by comparison of the voltage across the series transistor with the limit voltage.

13. The power supply as claimed in claim 11, wherein the current limiting element is a series transistor connected in series with a measurement resistor and driven by a transistor whose input circuit is supplied firstly with a signal proportional to the voltage drop across the measurement resistor and secondly with a signal proportional to the voltage across the series transistor.

14. The power supply as claimed in claim 11, wherein the current limiting element is a series transistor connected in series with a measurement resistor and driven by two control amplifiers, with one control amplifier being supplied firstly with a reference value corresponding to the maximum power loss and secondly with the output of a multiplier, adapted to multiply the measured series current by the voltage across the series transistor, and with the other control amplifier being supplied with the measured series current and with a reference value corresponding to the maximum current.

15. A power supply, comprising:
an energy-storage capacitor; and
a power loss limiting circuit including a current limiting element and a drive circuit, wherein current and voltage across the current limiting element are measured and supplied as variables to the drive circuit to ensure that the current limiting element is loaded with no more than a maximum power loss and wherein the energy storage capacitor is adapted to be charged via the current limiting element.

16. The power supply as claimed in claim 15, wherein the current limiting element includes a series transistor connected in series with a measurement resistor, a control electrode of the series transistor being driven firstly via a further transistor and secondly via a comparator signal, obtained by comparison of the voltage across the series transistor with a limit voltage.

17. The power supply as claimed in claim 15, wherein the current limiting element includes a series transistor connected in series with a measurement resistor and driven by a transistor whose input circuit is supplied firstly with a signal proportional to the voltage drop across the measurement resistor and secondly with a signal proportional to the voltage across the series transistor.

18. The power supply as claimed in claim 15, further comprising a rectifier for rectifying an input AC voltage, wherein the energy storage capacitor is adapted to be charged from the rectified input voltage, via the current limiting element.

19. The power supply as claimed in claim 15, wherein the drive circuit is set up via the limiting element to regulate the current essentially along a hyperbola corresponding to the maximum power loss.

20. The power supply as claimed in claim 15, wherein the drive circuit is set up to switch off the current via the current limiting element upon reaching a limit voltage corresponding to the maximum power loss.

* * * * *